UNITED STATES PATENT OFFICE.

EMIL FISCHER, OF BERLIN, GERMANY.

ORGANIC IODIN PREPARATION.

No. 842,140.   Specification of Letters Patent.   Patented Jan. 22, 1907.

Original application filed December 16, 1905, Serial No. 292,053. Divided and this application filed October 23, 1906. Serial No. 340,159.

*To all whom it may concern:*

Be it known that I, EMIL FISCHER, professor of chemistry, a citizen of the German Empire, residing at Berlin, Kingdom of Prussia, Germany, have invented new and useful Improvements in Iodin Preparations, of which the following is a specification.

The present application, which is a divisional application from my application Serial No. 292,053, filed December 16, 1905, relates specifically to magnesium salts of the mono-iodin derivatives of high-molecular fatty acids and the production thereof.

In order to produce the therapeutic effect of iodin in the human system, potassium iodid has been mostly used. This substance, however, is known to produce frequently symptoms for which the medical term "iodism" is applied. These symptoms are sore throat and eyes, nausea, eczema, and the like. Again, potassium iodid has a peculiar taste, against which many patients rebel. The hitherto-known therapeutic substitutes for potassium iodid are mostly oils possessing a disagreeable taste.

My new preparations which I have obtained by the action of hydrogen iodid on high-molecular acids of the oleic series—such as oleic acid, erucic acid, brassidic acid, elaidic acid, or the like—and by the transformation of the free acids into their salts distinguish themselves by being solid substances which have no taste. Clinical experience has shown that the symptoms of iodism are very rarely observed in their administration and that iodin in my preparations acts much more effectively than in the form of potassium iodid.

For the production of my new bodies the iodin-substituted acids obtained by the action of hydrogen iodid dissolved in glacial acetic acid on the high-molecular acids of the oleic series are transformed into the salts of magnesium. The preparation of these salts of the iodin derivatives of the high-molecular fatty acids must be carried out in such a manner that the resulting salts are neutral, because salts containing free acids have a faint odor and taste and cannot be kept without decomposition.

Under the terms "high-molecular acids of the oleic series" and "high-molecular fatty acids" those acids are generally understood which contain more than about twelve carbon atoms in their molecule.

In order to produce my new substances—for example, the magnesium salt of the mono iodo-behenic acid—I can proceed as follows, the parts being by weight:

Example 1: Twenty-seven parts of crystallized magnesium chlorid containing water of crystallization and fifteen parts of ammonium chlorid are dissolved in fifty-five parts of hot water. The solution is saturated with gaseous ammonia. The precipitate thus obtained is filtered off and the filtered solution is mixed with four hundred parts of methylic alcohol. To the liquid thus obtained a solution of fifty parts of iodo-behenic acid in four hundred parts of methylic alcohol is slowly added while stirring. The precipitated magnesium salt is filtered off, washed with methylic alcohol, water, and again with methylic alcohol, and dried *in vacuo*. It is a colorless and tasteless powder. It is formed according to the following equation:

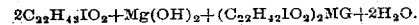

$$2C_{22}H_{43}IO_2 + Mg(OH)_2 + (C_{22}H_{42}IO_2)_2 MG + 2H_2O.$$

Example 2: The same salt results by the interaction of alkaline salts of iodo-behenic acid with magnesium chlorid in the following manner: Mono-iodo-behenic acid is dissolved in a somewhat larger quantity of caustic potash than is required by the acid by shaking it at ordinary temperature with highly-diluted caustic potash, (about one-fiftieth normal.) The calculated quantity of a dilute aqueous solution of chlorid of magnesium is added to the solution, and it is stirred until the flocculent colorless precipitate has settled. It is filtered off with suction, washed with water, then with alcohol, to remove small quantities of free iodo-behenic acid which may be present and dried *in vacuo*. This purification is not necessary if an aqueous solution of chlorid of magnesium mixed with an excess of ammonia be used. The precipitated magnesium salt of iodo-behenic acid is neutral and forms, after being washed with water and dried *in vacuo*, a white tasteless and odorless powder.

The mono-iodo-stearic acid is obtained from oleic acid in the same manner as the iodo-behenic acid from erucic acid. It is advantageous for the preparation of the mono-iodo-stearic acid to employ a somewhat larger quantity of hydrogen iodid on account of the smaller molecular weight of oleic acid. The iodo-stearic acid thus obtained is at ordinary temperature a faint yellow oil.

The preparation of other mono-iodin-substituted derivatives of high-molecular fatty acids and their salts of magnesium is carried out in an analogous manner. Brassidic acid, elaidic acid, or the like may be employed.

Having now described my invention and in what manner the same is to be performed, what I claim as new, and desire to secure by Letters Patent, is—

1. The herein-described salts of magnesium of the mono-iodin-substituted derivatives of high-molecular fatty acids obtained from the corresponding high-molecular acids of the oleic series which are solid, stable bodies, tasteless, colorless and insoluble in water, substantially as hereinbefore described.

2. The herein-described magnesium salt of mono-iodo-behenic acid $[(C_{22}H_{42}IO_2)_2Mg]$ obtained from mono-iodo-behenic acid, which is a solid, stable body, tasteless, colorless and insoluble in water, substantially as hereinbefore described.

In testimony whereof I have hereunto set my hand in the presence of two subscribing witnesses.

EMIL FISCHER.

Witnesses:
HENRY HASPER,
WOLDEMAR HAUPT.

---

Correction in Letters Patent No. 842,140.

It is hereby certified that in Letters Patent No. 842,140, granted January 22, 1907, upon the application of Emil Fischer, of Berlin, Germany, for an improvement in "Organic Iodin Preparations," an error appears in the printed specification requiring correction, as follows: In line 78, page 1, the formula printed "$2C_{22}H_{43}IO_2 + Mg(OH)_2 + (C_{22}H_{42}IO_2)_2 MG + 2H_2O$," should read $2C_{22}H_{43}IO_2 + Mg(OH)_2 = (C_{22}H_{42}IO_2)_2 MG + 2H_2O$; and that the said Letters Patent should be read with this correction therein that the same may conform to the record of the case in the Patent Office.

Signed and sealed this 12th day of February, A. D., 1907.

[SEAL.]

F. I. ALLEN,
*Commissioner of Patents.* mono-iodo-stearic acid to employ a somewhat larger quantity of hydrogen iodid on account of the smaller molecular weight of oleic acid. The iodo-stearic acid thus obtained is at ordinary temperature a faint yellow oil.

The preparation of other mono-iodin-substituted derivatives of high-molecular fatty acids and their salts of magnesium is carried out in an analogous manner. Brassidic acid, elaidic acid, or the like may be employed.

Having now described my invention and in what manner the same is to be performed, what I claim as new, and desire to secure by Letters Patent, is—

1. The herein-described salts of magnesium of the mono-iodin-substituted derivatives of high-molecular fatty acids obtained from the corresponding high-molecular acids of the oleic series which are solid, stable bodies, tasteless, colorless and insoluble in water, substantially as hereinbefore described.

2. The herein-described magnesium salt of mono-iodo-behenic acid $[(C_{22}H_{42}IO_2)_2Mg]$ obtained from mono-iodo-behenic acid, which is a solid, stable body, tasteless, colorless and insoluble in water, substantially as hereinbefore described.

In testimony whereof I have hereunto set my hand in the presence of two subscribing witnesses.

EMIL FISCHER.

Witnesses:
HENRY HASPER,
WOLDEMAR HAUPT.

---

Correction in Letters Patent No. 842,140.

It is hereby certified that in Letters Patent No. 842,140, granted January 22, 1907, upon the application of Emil Fischer, of Berlin, Germany, for an improvement in "Organic Iodin Preparations," an error appears in the printed specification requiring correction, as follows: In line 78, page 1, the formula printed "$2C_{22}H_{43}IO_2 + Mg(OH)_2 + (C_{22}H_{42}IO_2)_2 MG + 2H_2O$," should read $2C_{22}H_{43}IO_2 + Mg(OH)_2 = (C_{22}H_{42}IO_2)_2 MG + 2H_2O$; and that the said Letters Patent should be read with this correction therein that the same may conform to the record of the case in the Patent Office.

Signed and sealed this 12th day of February, A. D., 1907.

[SEAL.]

F. I. ALLEN,
*Commissioner of Patents.*

Correction in Letters Patent No. 842,140.

It is hereby certified that in Letters Patent No. 842,140, granted January 22, 1907, upon the application of Emil Fischer, of Berlin, Germany, for an improvement in "Organic Iodin Preparations," an error appears in the printed specification requiring correction, as follows: In line 78, page 1, the formula printed "$2C_{11}H_{13}IO_3 + Mg(OH)_2 + (C_{11}H_{12}IO_3)_2 MG + 2H_2O$," should read $2C_{11}H_{13}IO_3 + Mg(OH)_2 = (C_{11}H_{12}IO_3)_2 MG + 2H_2O$; and that the said Letters Patent should be read with this correction therein that the same may conform to the record of the case in the Patent Office.

Signed and sealed this 12th day of February, A. D., 1907.

[SEAL.]

F. I. ALLEN,
*Commissioner of Patents.*